United States Patent
Park et al.

(10) Patent No.: US 10,511,039 B2
(45) Date of Patent: Dec. 17, 2019

(54) SOLID STATE HYDROGEN STORAGE DEVICE AND SOLID STATE HYDROGEN STORAGE SYSTEM

(71) Applicant: Hyundai Motor Company, Seoul (KR)

(72) Inventors: Sangbaek Park, Seoul (KR); Dong Hoon Nam, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 227 days.

(21) Appl. No.: 15/357,565

(22) Filed: Nov. 21, 2016

(65) Prior Publication Data

US 2017/0214067 A1    Jul. 27, 2017

(30) Foreign Application Priority Data

Jan. 26, 2016    (KR) .................. 10-2016-0009639

(51) Int. Cl.
| | |
|---|---|
| *H01M 8/04302* | (2016.01) |
| *C01B 3/00* | (2006.01) |
| *H01M 8/04014* | (2016.01) |
| *H01M 8/04029* | (2016.01) |
| *H01M 8/04082* | (2016.01) |
| *B60L 58/31* | (2019.01) |
| *B60L 58/34* | (2019.01) |
| *H01M 8/04225* | (2016.01) |

(52) U.S. Cl.
CPC ......... *H01M 8/04302* (2016.02); *B60L 58/31* (2019.02); *B60L 58/34* (2019.02); *C01B 3/0031* (2013.01); *C01B 3/0057* (2013.01); *H01M 8/04014* (2013.01); *H01M 8/04029* (2013.01); *H01M 8/04216* (2013.01); *H01M 8/04225* (2016.02); *H01M 2250/20* (2013.01); *Y02E 60/321* (2013.01); *Y02E 60/327* (2013.01); *Y02E 60/36* (2013.01); *Y02T 90/32* (2013.01)

(58) Field of Classification Search
None
See application file for complete search history.

(56) References Cited

U.S. PATENT DOCUMENTS

| | | |
|---|---|---|
| 8,940,083 B2 | 1/2015 | De Rango et al. |
| 2005/0013770 A1 | 1/2005 | Schulz et al. |
| 2009/0155648 A1* | 6/2009 | Lee ............... F17C 11/005 |
| | | 429/515 |
| 2010/0326992 A1 | 12/2010 | De Rango et al. |

FOREIGN PATENT DOCUMENTS

| | | | |
|---|---|---|---|
| JP | 62-022883 A | | 1/1987 |
| JP | 2005-282828 A | | 10/2005 |
| JP | 2011-508855 A | | 3/2011 |
| JP | 2014097443 | * | 5/2014 |
| JP | 2015-096745 A | | 5/2015 |
| KR | 2009-0062587 A | | 6/2009 |

OTHER PUBLICATIONS

Young et al., "The Current Status of Hydrogen Storage Alloy Development for Electrochemical Applications", Materials, 6, 4574-4608 (2013).*

Garrier et al., "MgH2 intermediate scale tank tests under various experimental conditions", Int. J. Hydrogen Energ. 36 (2011) 9719-9726.

Ned T. Stetson, Hydrogen Storage Overview—US DOE—2012 Annual Merit Review and Peer Evalution Meeting, May 15, 2012.

* cited by examiner

*Primary Examiner* — Ladan Mohaddes

(74) *Attorney, Agent, or Firm* — Mintz Levin Cohn Ferris Glovsky and Popeo, P.C.; Peter F. Corless

(57) ABSTRACT

A solid-state hydrogen storage device and a solid-state hydrogen storage system are provided. The solid-state hydrogen storage device includes a storage unit that stores a first hydrogen storage material therein and a heat medium pipe that is disposed in the storage unit including a heat medium and a second hydrogen storage material. The heat medium pipe includes a separating pipe disposed therein to separate the heat medium and the second hydrogen storage material from each other, and the second hydrogen storage material is disposed in the separating pipe.

17 Claims, 3 Drawing Sheets

SOLID STATE HYDROGEN STORAGE DEVICE AND SOLID STATE HYDROGEN STORAGE SYSTEM

CROSS-REFERENCE TO RELATED APPLICATION

This application claims priority to and the benefit of Korean Patent Application No. 10-2016-0009639 filed in the Korean Intellectual Property Office on Jan. 26, 2016, the entire contents of which are incorporated herein by reference.

TECHNICAL FIELD

The present invention relates to a solid-state hydrogen storage device and a solid-state hydrogen storage system.

BACKGROUND

In general, a complex metal hydride or a metal hydride has been used to improve voltage storage density of a solid-state hydrogen storage system and hydrogen can be released from the hydride compounds by continuously supplying heat. Accordingly, a technique has been being particularly required for improving heat-supplying efficiency of a heat exchanger having a predetermined size.

Currently, research has been conducted regarding an internal structure of a solid-state hydrogen storage vessel to improve heat supply of the vessel. However, since the vessel structure is changed, a material type and size of fins and tubes, and a loading method of a hydrogen storage material are required to be changed.

Particularly, since the metal hydride is operated at a high temperature of about 100° C., when the metal hydride is applied to a vehicle, it is required to improve cold start performance. Accordingly, various methods such as a method of mounting a hydrogen heat combustor or a method of heating a solid-state hydrogen storage system using battery power have been developed. However, these methods may cause an increase in a system volume and an energy loss.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention may improve cold start performance required for applying a metal hydride to a vehicle.

The present invention provides a solid-state hydrogen storage device and a solid-state hydrogen storage system having substantially improved cold start performance by enhancing a heat supply method for increasing a releasing speed of hydrogen of a metal hybrid when the metal hybrid is applied to a vehicle.

An exemplary embodiment of the present invention provides a solid-state hydrogen storage device that may include: a storage unit configured to store a first hydrogen storage material therein; and a heat medium pipe disposed in the storage unit including a heat medium and a second hydrogen storage material. The heat medium pipe may include a separating pipe disposed therein to separate the heat medium and the second hydrogen storage material from each other, and the second hydrogen storage material may be disposed in the separating pipe. The second hydrogen storage material may release heat during hydrogen absorption.

The separating pipe may include steel, aluminum (Al), or copper (Cu). The steel, as used herein, may be an alloy steel or stainless steel comprising iron (Fe) as a major component, aluminum (Al) or chromium (Cr), where the major component may constitute the alloy steel in greater than about 50 wt %, greater than about 60 wt %, greater than about 70 wt %, greater than about 80 wt %, greater than about 90 wt %, or greater than about 95 wt % of the total alloy composition.

The first hydrogen storage material may be a complex metal hydride, a metal hydride, a chemical hydride, a hydrogen storage alloy, or a combination thereof. The complex metal hydride may be selected from the group consisting of $M^1AH_4$, $M^2(AlH_4)_2$, $M^3BH_4$, $M^4(BH_4)_2$, $M^5(BH_4)_3$, $M^6NH_2$, $M^7(NH_2)_2$, $Li_2NH$, $MgNH$, lithium-magnesium amide, lithium-magnesium imide, and a combination thereof, where $M^1$ may be Li, Na, or Al, $M^2$ may be Mg or Ca, and $M^3$ may be Li, Na, or K, $M^4$ may be Mg or Ca, $M^5$ may be Al or Ti, $M^6$ may be Li or Na, and $M^7$ may be Mg or Ca.

The metal hydride may be selected from the group consisting of $M^8H$, $M^9H_2$, and a combination thereof, $M^8$ may be Li, Na, K, Rb, or Cs, and $M^9$ may be Mg, Ca, Sc, Ti, or V. The chemical hydride may be selected from the group consisting of $AlH_3$, $NH_3BH_3$, $NH_4B_3H_8$, $NH_2B_2H_5$, $NaBP_2H_8$, and a combination thereof. The first hydrogen storage material may be $NaAlH_4$, or a compound or composite including $Mg(NH_2)_2$ and LiH. The hydrogen storage alloy may be selected from the group consisting of Ti—Cr—V alloy, TiFe, Pd-$M^{10}$, Li-$M^{11}$, a Mg—Co alloy, a La—Ni alloy, and a combination thereof, where $M^{10}$ may be Ba, Y, or La, and $M^{11}$ may be Ti, V, Zr, Nb, or Hf. The second hydrogen storage material may be an Fe—Ti alloy or a La—Ni alloy. The heat medium may be water, air, oil, or a combination thereof. The solid-state hydrogen storage device may be for a vehicle.

An exemplary embodiment of the present invention may provide a solid-state hydrogen storage system that may include: a storage unit configured to store a first hydrogen storage material therein; and a heat medium pipe disposed in the storage unit including a heat medium and a second hydrogen storage material. The heat medium pipe may include a separating pipe disposed therein to separate the heat medium and the second hydrogen storage material from each other, and the second hydrogen storage material may be disposed in the separating pipe, heat may be released from the second hydrogen storage material during hydrogen absorption. The heat released during the hydrogen absorption may be supplied to the first hydrogen storage material included in the storage unit through the heat medium included in the heat medium pipe, thereby releasing hydrogen from the first hydrogen storage material.

The separating pipe may include steel, Al, or Cu. The first hydrogen storage material may be $NaAlH_4$, or a compound or composite including $Mg(NH_2)_2$ and LiH. The second hydrogen storage material may be an Fe—Ti alloy or a La—Ni alloy. The solid-state hydrogen storage system may be for a vehicle.

Further provided is a vehicle that may comprise solid the state hydrogen storage device and the solid state hydrogen storage system as disclosed herein.

Other aspects of the invention are disclosed infra.

According to various exemplary embodiments of the present invention, a solid-state hydrogen storage device and a solid-state hydrogen storage system may improve cold start performance by enhancing a heat supply method for increasing a releasing speed of hydrogen of a metal hybrid when the metal hybrid is applied to a vehicle. Further, when a d-state hydrogen storage device and a d-state hydrogen storage system are applied to a vehicle, vehicle loading may be optimized by reducing a volume of the hydrogen supply system, and energy efficiency may be improved.

DESCRIPTION OF THE DRAWINGS

It should be understood that the accompanying drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

Description of Symbols

Figure 1:
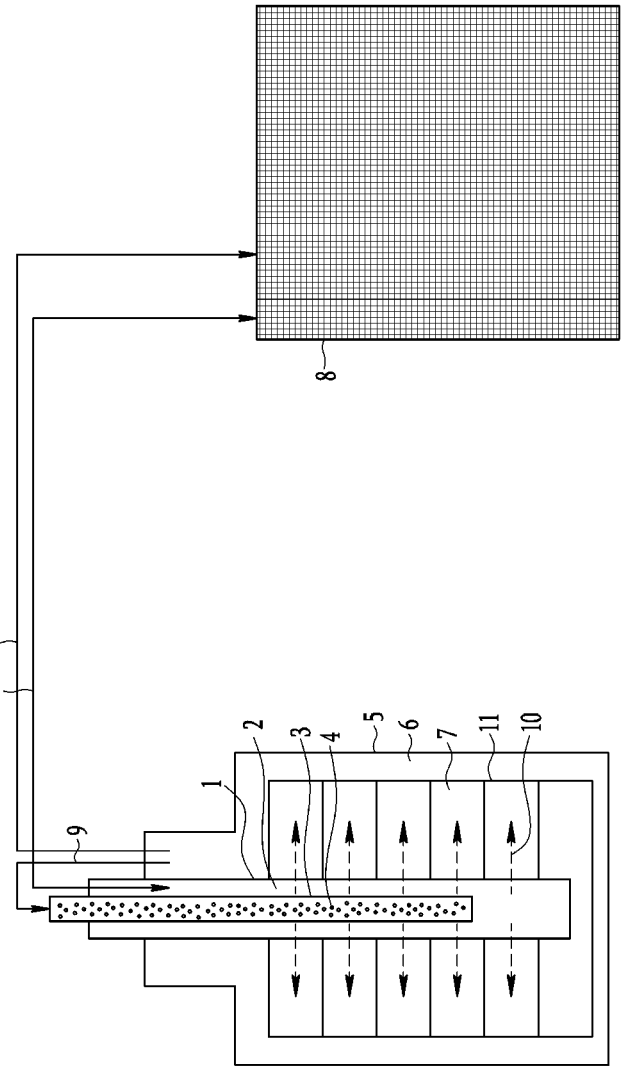
FIG. 1 illustrates an exemplary solid-state hydrogen storage device according to an exemplary embodiment of the present invention.

1: heat medium pipe
2: heat medium
3: separating pipe
4: second hydrogen storage material
5: storage vessel
6: compressed gaseous hydrogen
7: metal hydride
8: fuel cell
9: path through which gaseous hydrogen is transferred to separating pipe
10: path through which heat is transferred from second hydrogen storage material to metal hydride
11: storage unit
12: moving path of heat medium
13: path through which gaseous hydrogen is transferred to fuel cell

DETAILED DESCRIPTION

Hereinafter, exemplary embodiments of the present invention will be described in detail. However, the exemplary embodiments are illustrative only but are not to be construed to limit the present invention, and the present invention is just defined by the scope of the claims as will be described below.

The drawings and description are to be regarded as illustrative in nature and not restrictive. Like reference numerals designate like elements throughout the specification. In addition, the size and thickness of each configuration shown in the drawings are arbitrarily shown for better understanding and ease of description, but the present invention is not limited thereto.

In the drawings, the thickness of layers, films, panels, regions and the like, are exaggerated for clarity. In the drawings, for better understanding and ease of description, the thickness of some layers and areas is exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, the word "on" means positioning on or below the object portion, but does not essentially mean positioning on the upper side of the object portion based on a gravity direction.

Further, the terminology used herein is for the purpose of describing particular exemplary embodiments only and is not intended to be limiting of the invention. As used herein, the singular forms "a", "an" and "the" are intended to include the plural forms as well, unless the context clearly indicates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

As described above, currently, studies on improving an internal structure of a solid-state hydrogen storage vessel to improve heat supply of the vessel have been globally progressing. However, since the vessel structure is changed, a material type and a size of fins, tubes, and the like and a loading method of a hydrogen storage material may be required to be changed. Particularly, due to the metal hydride that is operated at a high temperature of about 100° C., when the metal hydride is applied to a vehicle, it is required to improve cold start performance. Accordingly, various methods such as a method of mounting a hydrogen heat combustor or a method of heating a solid-state hydrogen storage system by using battery power have been suggested. However, these methods may cause an increase in a system volume and energy loss.

Accordingly, exemplary embodiments of the present invention provide a solid-state hydrogen storage device and a solid-state hydrogen storage system which may substantially improve cold start performance using a heat medium pipe including a hydrogen storage alloy that releases heat during hydrogen absorption. Particularly, during cold starting of a vehicle, when some hydrogen of a hydrogen storage vessel in which a hydrogen fuel is stored is supplied to a storage alloy and is stored in the storage alloy, thus-generated heat may be used efficiently to heat the hydrogen storage vessel. In general, performance of a heat exchanger required for heat supply may be proportional to a size thereof. Accordingly, when the heat supply efficiency may be improved, the size of the heat exchanger may be reduced, and an additional BOP (balance of plant) volume may be reduced by, e.g., mounting a hydrogen heat combustor or heating a solid-state hydrogen storage system by using battery power.

As a result, since a volume of the solid-state hydrogen storage system may be reduced by using the hydrogen storage alloy as one of the methods of heating the system, it may provide advantageous for vehicle loading, cold start improvement, and continuous hydrogen release.

Figure 2:
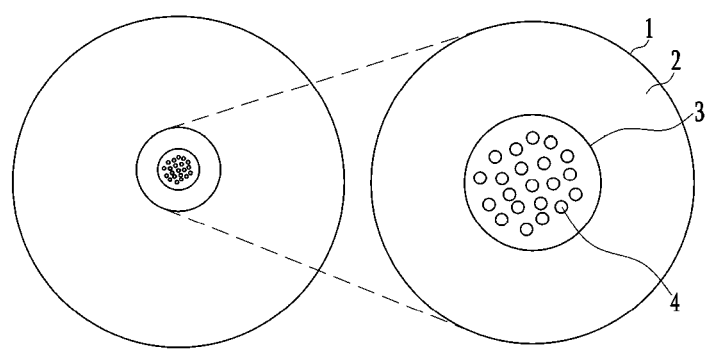
FIG. 2 illustrates a heat medium pipe according to an exemplary embodiment of the present invention.

FIG. 1 illustrates an exemplary solid-state hydrogen storage device according to an exemplary embodiment of the present invention. FIG. 2 shows a cross-sectional view of an exemplary heat medium pipe according to an exemplary embodiment of the present invention. As shown FIG. 1 and FIG. 2, according to the present exemplary embodiment, the solid-state hydrogen storage device may include a storage unit 11 configured to store a first hydrogen storage material therein, and a heat medium pipe 1 disposed in the storage unit 11 including a heat medium 2 and second hydrogen storage materials 4. The heat medium pipe 1 may include a separating pipe 3 disposed therein to separate the heat medium 2 and the second hydrogen storage materials 4 from each other, and the second hydrogen storage materials 4 may be disposed in the separating pipe 3.

The second hydrogen storage materials 4 may be configured to release heat during the hydrogen absorption. Particularly, the second hydrogen storage materials 4 may include materials that release heat by a hydrogen storage reaction inside the heat medium pipe 1, and may be hydrogen storage materials that may be operated in an operational temperature range of about −40 to 40° C. and have a weight storage capacity of about 3 wt % or greater. Such materials may be any materials that may have storing and releasing reaction speeds greater than that of the first hydrogen storage material serving as the hydrogen fuel. In addition, those materials may facilitate rapid heat supply to the first hydrogen storage material using an exothermic reaction and an endothermic reaction which may be performed at this time. Detailed examples of the materials may include hydrogen storage alloys and composite materials obtained by combining two or more types thereof.

The first hydrogen storage material may be selected from the group consisting of a complex metal hydride, a metal hydride, a chemical hydride, a hydrogen storage alloy, and a combination thereof. This first hydrogen storage material may be a high-capacity hydrogen storage material that may be used as a main fuel for supplying a hydrogen fuel, may be operated in an operational temperature range of about 60 to 400° C., and may have a weight storage density of about 4 wt %. Exemplary first hydrogen storage material may include a complex metal hydride, a metal hydride, a chemical hydride, and a hydrogen storage alloy, and a compound or composite obtained by combining two or more kinds thereof.

When a vehicle is started, hydrogen is supplied to the second hydrogen storage materials included in the separating pipe to be absorbed thereinto, thereby releasing heat. This heat may be transferred to a heat medium in the heat medium pipe through the separating pipe, and thus the heat medium may be rapidly heated in an initial stage of vehicle starting. For example, a temperature of the heat medium may be raised to a temperature of about 100° C. within one minute in the initial stage of vehicle starting. The heat transferred to the heat medium may be re-transferred to the first hydrogen storage material included in the storage unit so that the first hydrogen storage material may be heated to a reaction temperature to release hydrogen. As a result, the hydrogen as a fuel may be supplied to a fuel cell.

In the first hydrogen storage material, the complex metal hydride may be selected from the group consisting of $M^1AlH_4$, $M^2(AlH_4)_2$, $M^3BH_4$, $M^4(BH_4)_2$, $M^5(BH_4)_3$, $M^6NH_2$, $M^7(NH_2)_2$, $Li_2NH$, $MgNH$, lithium-magnesium amide, lithium-magnesium imide, and a combination thereof. However, according to the exemplary embodiment of the present invention, the complex metal hydride may be any material that can be used as a hydrogen fuel source of the solid-state hydrogen storage without being limited thereto.

Particularly, $M^1$ may be Li, Na, or Al, $M^2$ may be Mg or Ca, $M^3$ indicates Li, Na, or K, $M^4$ may be Mg or Ca, $M^5$ may be Al or Ti, $M^6$ may be Li or Na, and $M^7$ may be Mg or Ca.

In the first hydrogen storage material, the metal hydride may be $M^8H$, $M^9H_2$, or a combination thereof. However, according to the exemplary embodiment of the present invention, the metal hydride may be any material that can be used as a hydrogen fuel source of the solid-state hydrogen storage without being limited thereto.

Particularly, $M^8$ may be Li, Na, K, Rb, or Cs, and $M^9$ may be Mg, Ca, Sc, Ti, or V.

In the first hydrogen storage material, the chemical hydride may be selected from the group consisting of $AlH_3$, $NH_3BH_3$, $NH_4B_3H_8$, $NH_2B_2H_5$, $NaBP_2H_8$, and a combination thereof. However, according to the exemplary embodiment of the present invention, the chemical hydride may be any material that can be used as a hydrogen fuel source of the solid-state hydrogen storage without being limited thereto.

In particular, first hydrogen storage material may be $NaAlH_4$, or a compound or composite including $Mg(NH_2)_2$ and LiH as an optimized material.

In the first hydrogen storage material, the hydrogen storage alloy may be selected from the group consisting of Ti—Cr—V alloy, TiFe, Pd-$M^{10}$, Li-$M^{11}$, a Mg—Co alloy, a La—Ni alloy, and a combination thereof. However, according to the exemplary embodiment of the present invention, the hydrogen storage alloy may be any material that may be used as a hydrogen fuel source of the solid-state hydrogen storage without being limited thereto.

For example, the second hydrogen storage materials may include a Ti—Cr—V alloy, TiFe, Pd-$M^{10}$, Li-$M^{11}$, a Mg—Co alloy, a La—Ni alloy, or a combination thereof. However, according to the exemplary embodiment of the present invention, the second hydrogen storage materials may include any material that can be used as a hydrogen fuel source of the solid-state hydrogen storage without being limited thereto.

In particular, $M^{10}$ may be Ba, Y, or La, and $M^{11}$ may be Ti, V, Zr, Nb, or Hf.

The second hydrogen storage materials may include an Fe—Ti alloy or a La—Ni alloy.

Moreover, the solid-state hydrogen storage device according to the exemplary embodiment of the present invention features mounting a heat exchanger formed of a heat medium pipe including a hydrogen storage alloy in a metal hydride based solid-state hydrogen storage vessel. This solid-state hydrogen storage device may substantially improve an initial cold start characteristic using an exothermic reaction, which may be performed when hydrogen is stored in a hydrogen storage alloy, by inserting a pipe in which the hydrogen storage alloy may be included in a heat medium pipe. That is, unlike a conventional system including a heat exchanger formed of a simple heat medium or additional BOP such as a hydrogen combustion auxiliary tank or a battery to improve the cold start characteristic.

For example, the metal hydride may be a hydrogen fuel supply source and may include a complex metal hydride comprising $Mg(NH_2)_2$ and LiH or $NaAlH_4$, or $2LiBH_4$ and $MgH_2$ operated at an operational temperature of about 100° C. However, although they have a hydrogen storage capacity of about 5 wt %, a hydrogen releasing speed may be slow. Accordingly, the hydrogen releasing speed may be improved by efficiently supplying heat to the metal hydride for continuously releasing hydrogen. A hydrogen storage alloy constituting the second hydrogen storage materials may include $Mg_2Ni$, $LaNi_5$, or Fe—Ti components. They have a storage capacity of about 2 wt % or less and substantially improved storing and releasing speeds of hydrogen. The heat supply may be efficiently controlled by using an exothermic reaction and an endothermic reaction which may be performed at this time.

Particularly, when the metal hydride and the hydrogen storage alloy are simply mixed or arranged, it may not be easy to control quick exothermic and endothermic characteristics of the hydrogen storage alloy. However, as in the exemplary embodiment of the present invention, when the metal hydride and the hydrogen storage alloy are separated from each other by inserting the hydrogen storage alloy into the heat medium pipe, heat may be supplied to the metal hydride to efficiently adjust the quick exothermic and endothermic characteristics of the hydrogen storage alloy.

The separating pipe may include any material that may more easily transfer the heat released when hydrogen is absorbed by the second hydrogen storage materials to the heat medium disposed extraneous to the separating pipe. For example, a material of the separating pipe may include a steel (e.g. SUS as defined by Japanese Industrial Standards), Al, or Cu, which have an excellent heat conduction characteristic. In particular, the separating pipe may include Al as major components. In particular, a weight of the system may be reduced while maintaining the same or greater heat supply rate as compared with other materials.

As the heat medium, water, air, oil, or a combination thereof may be employed. However, any typical heat medium that is usable in a temperature range of about −40 to 400° C. may be employed as the heat medium without being limited thereto. For example, when a material that stores and releases hydrogen has an operating temperature which is less than about 100° C., water may be employed as the heat medium. When a material that stores and releases hydrogen has an operating temperature which is equal to or greater than about 100° C., oil may be employed as the heat medium.

Based on the aforementioned contents, the solid-state hydrogen storage device may be used for a vehicle.

In another exemplary embodiment of the present invention, a solid-state hydrogen storage system may include a storage unit 11 configured to store a first hydrogen storage material therein, and a heat medium pipe 1 disposed in the storage unit 11 including a heat medium 2 and second hydrogen storage materials 4. The heat medium pipe 1 may include a separating pipe 3 disposed therein to separate the heat medium 2 and the second hydrogen storage materials 4 from each other, and the second hydrogen storage materials 4 may be disposed in the separating pipe 3. Heat may be released from the second hydrogen storage materials 4 when hydrogen is absorbed. The heat released during the hydrogen absorption may be supplied to the first hydrogen storage material included in the storage unit 11 through the heat medium 2 included in the heat medium pipe 1, thereby releasing hydrogen from the first hydrogen storage material.

The second hydrogen storage materials 4 may release heat during the hydrogen absorption. In particular, the second hydrogen storage materials 4 may be materials that release heat by a hydrogen storage reaction inside the heat medium pipe 1, and may be hydrogen storage materials that are operated in an operational temperature range of about −40 to 40° C. and have a weight storage capacity of about 3 wt % or greater. Such materials may be any materials that have storing and releasing reaction speeds that may be greater than that of the first hydrogen storage material serving as the hydrogen fuel. Those materials may facilitate rapid heat supply to the first hydrogen storage material by using an exothermic reaction and an endothermic reaction which are performed at this time. Detailed examples of the materials may include hydrogen storage alloys and compounds or composites obtained by combining two or more types thereof.

The first hydrogen storage material may be a complex metal hydride, a metal hydride, a chemical hydride, a hydrogen storage alloy, or a combination thereof. This first hydrogen storage material may be a high-capacity hydrogen storage material that may serve as a main fuel for supplying a hydrogen fuel, may be operated in an operational temperature range of about 60 to 400° C., and may have a weight storage density of about 4 wt %. Detailed examples of the materials may include a complex metal hydride, a metal hydride, a chemical hydride, and a hydrogen storage alloy, and a compound or composite obtained by combining two or more kinds thereof.

When a vehicle is started, hydrogen may be supplied to the second hydrogen storage materials included in the separating pipe to be absorbed thereinto, thereby releasing heat. This heat may be transferred to a heat medium in the heat medium pipe through the separating pipe, and thus the heat medium may be quickly heated in an initial stage of vehicle starting. For example, a temperature of the heat medium may increase to a temperature of about 100° C. within one minute in the initial stage of vehicle starting. The heat transferred to the heat medium may be re-transferred to the first hydrogen storage material included in the storage unit so that the first hydrogen storage material may be heated to a reaction temperature to release hydrogen. As a result, the hydrogen as a fuel may be supplied to a fuel cell.

In the first hydrogen storage material, the complex metal hydride may be selected from the group consisting of $M^1AlH_4$, $M^2(AlH_4)_2$, $M^3BH_4$, $M^4(BH_4)_2$, $M^5(BH_4)_3$, $M^6NH_2$, $M^7(NH_2)_2$, $Li_2NH$, MgNH, lithium-magnesium amide, lithium-magnesium imide, and a combination thereof. However, according to the exemplary embodiment of the present invention, the complex metal hydride may be any material that may be used as a hydrogen fuel source of the solid-state hydrogen storage without being limited thereto.

In particular, $M^1$ may be Li, Na, or Al, $M^2$ may be Mg or Ca, $M^3$ may be Li, Na, or K, $M^4$ may be Mg or Ca, $M^5$ may be Al or Ti, $M^6$ may be Li or Na, and $M^7$ indicates Mg or Ca.

In the first hydrogen storage material, the metal hydride may be $M^8H$, $M^9H_2$, or a combination thereof. However, according to the exemplary embodiment of the present invention, the metal hydride may be any material that may be used as a hydrogen fuel source of the solid-state hydrogen storage without being limited thereto.

In particular, $M^8$ may be Li, Na, K, Rb, or Cs, and $M^9$ may be Mg, Ca, Sc, Ti, or V.

In the first hydrogen storage material, the chemical hydride may be selected from the group consisting of $AlH_3$, $NH_3BH_3$, $NH_4B_3H_8$, $NH_2B_2H_5$, $NaBP_2H_8$, and a combination thereof. However, according to the exemplary embodiment of the present invention, the chemical hydride may be any material that may be used as a hydrogen fuel source of the solid-state hydrogen storage without being limited thereto.

In particular, an optimized material of the first hydrogen storage material may be NaAlH$_4$, or a compound or composite including Mg(NH$_2$)$_2$ and LiH.

In the first hydrogen storage material, the hydrogen storage alloy may be selected from the group consisting of Ti—Cr—V alloy, TiFe, Pd-M$^{10}$, Li-M$^{11}$, a Mg—Co alloy, a La—Ni alloy, and a combination thereof. However, according to the exemplary embodiment of the present invention, the hydrogen storage alloy may be any material that may be used as a hydrogen fuel source of the solid-state hydrogen storage without being limited thereto.

For example, the second hydrogen storage materials may include one selected from the group consisting of a Ti—Cr—V alloy, TiFe, Pd-M$^{10}$, Li-M$^{11}$, a Mg—Co alloy, a La—Ni alloy, and a combination thereof. However, according to the exemplary embodiment of the present invention, the second hydrogen storage materials may include of any material that may be used as a hydrogen fuel source of the solid-state hydrogen storage without being limited thereto.

In particular, M$^{10}$ may be Ba, Y, or La, and M$^{11}$ may be Ti, V, Zr, Nb, or Hf.

The second hydrogen storage materials may include an exemplary material such as an Fe—Ti alloy or a La—Ni alloy.

The separating pipe may include any material that may more easily transfer the heat released when hydrogen is absorbed by the second hydrogen storage materials to the heat medium disposed outside the separating pipe. For example, a material of the separating pipe may include a steel (e.g. SUS), Al, or Cu, which may have an excellent heat conduction characteristic. In particular, the separating pipe may include Al as a major component. For example, a weight of the system may be reduced while maintaining the same or greater heat supply rate as compared with other materials.

Accordingly, the solid-state hydrogen storage device according to the exemplary embodiment of the present invention features mounting a heat exchanger formed of a heat medium pipe including a hydrogen storage alloy in a metal hydride based solid-state hydrogen storage vessel. This solid-state hydrogen storage device may significantly improve an initial cold start characteristic using an exothermic reaction, which may be performed when hydrogen is stored in a hydrogen storage alloy, by inserting a pipe in which the hydrogen storage alloy is included in a heat medium pipe. That is, distinct from a conventional system including a heat exchanger formed of a simple heat medium or additional BOP such as a hydrogen combustion auxiliary tank or a battery to increase the cold start characteristic.

An operational process of the solid-state hydrogen storage system according to the exemplary embodiment of the present invention will be described in detail with reference to FIG. 1.

First, when a vehicle is started, gaseous hydrogen 6 included in a storage vessel 5, which may be compressed to a pressure of about 100 bar, may be supplied to a fuel cell 8 to perform cold start. In particular, a minimal amount of gaseous hydrogen may be transferred to the separating pipe 3 included in the heat medium pipe 1 (see reference numeral 9) including the second hydrogen storage alloys 4. That is, no hydrogen may be stored in the second hydrogen storage alloys 4.

Arrows 10 shown in FIG. 1 indicate a path through which heat is transferred from the second hydrogen storage alloys 4 to the metal hydride serving as a main supply source of the hydrogen fuel. As described above, when gaseous hydrogen is supplied to the separating pipe 3, the hydrogen storage alloys 4 included in the separating pipe 3 may be subjected to a hydrogen absorbing reaction which is an exothermic reaction to release heat. Heat generated by the hydrogen absorbing reaction in the hydrogen storage alloys 4 included in the separating pipe 3 may be transferred to the heat medium 2 through the separating pipe 3. Accordingly, a temperature of the heat medium 2 may be increased to a temperature of about 100° C. within one minute. Such heat of the heat medium 2 may be transferred to the metal hydride 7 serving as a main supply source of the hydrogen fuel positioned around the heat medium pipe 1 through the heat medium pipe 1. As a result, a temperature of the metal hydride 7 may be increased, and thus the metal hydride 7 may be reacted to release hydrogen.

In particular, the heat medium 2 having an increased temperature may be supplied to the fuel cell 8 to improve cold start performance of the fuel cell 8 as indicated by reference numeral 12 of FIG. 1. In contrast, waste heat of the fuel cell 8 may be additionally supplied to the heat medium pipe 1, thereby improving heat efficiency.

The following example illustrates the present invention in more detail. However, the following example is for illustrative purposes only, and the scope of the present invention is not limited thereto.

EXAMPLE

A temperature of a hydrogen storage tank formed of a LaNi$_5$ hydrogen storage alloy was measured as heat generated during hydrogen absorption was transferred thereto while hydrogen was supplied at a pressure of 50 bar. A weight of the hydrogen storage tank was 6 kg.

Figure 3:
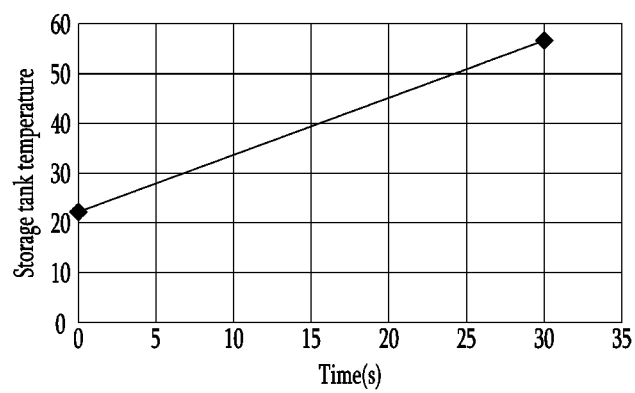
FIG. 3 is a graph showing a test result of an increase of a temperature of an exemplary hydrogen storage tank according to an exemplary hydrogen absorbing reaction time when an exemplary $LaNi_5$ hydrogen storage alloy is used according to an exemplary embodiment of the present invention.

The result is shown in FIG. 3. As shown in FIG. 3, the temperature of the hydrogen storage tank was increased from room temperature to 60° C. in 30 minutes after hydrogen was supplied. As a result, a temperature of a heat medium pipe was increased to a temperature of about 100° C. or greater according to a hydrogen supply pressure and a reaction time.

In particular, hydrogen may be supplied and absorbed to a material that releases heat during hydrogen absorption, such as a LaNi$_5$ hydrogen storage alloy, thereby releasing heat. Such heat may be transferred to a heat medium included in the heat medium pipe through a separating pipe. For example, a temperature of the heat medium may be increased to a temperature of about 100° C. within one min. during initial starting. The heat transferred to the heat medium may be re-transferred to the metal hydride serving as a main supply source of the hydrogen fuel included in the storage unit so that the metal hydride may be heated to a reaction temperature to release hydrogen. As a result, the hydrogen as a fuel may be supplied to a fuel cell. When a vehicle is started, the temperature of the metal hydride may be rapidly increased. Accordingly, an additional BOP (balance of plant) volume may be reduced by, e.g., mounting a hydrogen heat combustor or heating a solid-state hydrogen storage system using battery power. As a result, since a volume of the solid-state hydrogen storage system may be reduced, the solid-state hydrogen storage device or the solid-state hydrogen storage system as described herein may provide advantages for vehicle loading, cold start improvement, and continuous hydrogen release.

While this invention has been described in connection with what is presently considered to be practical exemplary embodiments, it is to be understood that the invention is not limited to the exemplary embodiments, but, on the contrary, is intended to cover various modifications and equivalent arrangements included within the spirit and scope of the appended claims.

DESCRIPTION OF SYMBOLS

1: heat medium pipe
2: heat medium
3: separating pipe
4: second hydrogen storage material
5: storage vessel
6: compressed gaseous hydrogen
7: metal hydride
8: fuel cell
9: path through which gaseous hydrogen is transferred to separating pipe
10: path through which heat is transferred from second hydrogen storage material to metal hydride
11: storage unit
12: moving path of heat medium
13: path through which gaseous hydrogen is transferred to fuel cell

What is claimed:
1. A solid-state hydrogen storage device, comprising:
a storage unit configured to store a first hydrogen storage material therein;
a heat medium pipe disposed in the storage unit including a heat medium;
a separating pipe disposed in the heat medium pipe including a second hydrogen storage material, wherein the second hydrogen storage material is enclosed in the heat medium; and
a first gas supply pipe connected with a storage vessel and the separating pipe,
wherein the first gas supply pipe supplies gaseous hydrogen included in a storage vessel to the separating pipe,
wherein the second hydrogen storage material releases heat during hydrogen absorption,
wherein heat is released from the second hydrogen storage material during hydrogen absorption, and
wherein the heat released during the hydrogen absorption is supplied to the first hydrogen storage material included in the storage unit through the heat medium included in the heat medium pipe, thereby releasing hydrogen from the first hydrogen storage material.

2. The solid-state hydrogen storage device of claim 1, wherein the separating pipe comprises steel, aluminum (Al), or copper (Cu).

3. The solid-state hydrogen storage device of claim 1, wherein the first hydrogen storage material is selected from the group consisting of a complex metal hydride, a metal hydride, a chemical hydride, a hydrogen storage alloy, and a combination thereof.

4. The solid-state hydrogen storage device of claim 3, wherein the complex metal hydride is selected from the group consisting of $M^1AlH_4$, $M^2(AlH_4)_2$, $M^3BH_4$, $M^4(BH_4)_2$, $M^5(BH_4)_3$, $M^6NH_2$, $M^7(NH_2)_2$, $Li_2NH$, $MgNH$, lithium-magnesium amide, lithium-magnesium imide, and a combination thereof,
wherein $M^1$ is Li, Na, or Al, $M^2$ is Mg or Ca, $M^3$ is Li, Na, or K, $M^4$ is Mg or Ca, $M^5$ is Al or Ti, $M^6$ is Li or Na, and $M^7$ is Mg or Ca.

5. The solid-state hydrogen storage device of claim 3, wherein the metal hydride is $M^8H$, $M^9H_2$, or a combination thereof, wherein $M^8$ is Li, Na, K, Rb, or Cs, and $M^9$ is Mg, Ca, Sc, Ti, or V.

6. The solid-state hydrogen storage device of claim 3, wherein the chemical hydride is selected from the group consisting of $AlH_3$, $NH_3BH_3$, $NH_4B_3H_8$, $NH_2B_2H_5$, $NaBP_2H_8$, and a combination thereof.

7. The solid-state hydrogen storage device of claim 3, wherein the first hydrogen storage material is $NaAlH_4$, or a composite including $Mg(NH_2)_2$ and LiH.

8. The solid-state hydrogen storage device of claim 1, wherein the second hydrogen storage alloy material is a Ti—Cr—V alloy, TiFe, Pd-$M^{10}$, Li-$M^{11}$, a Mg—Co alloy, a La—Ni alloy, or a combination thereof, wherein $M^{10}$ indicates Ba, Y, or La, and $M^{11}$ indicates Ti, V, Zr, Nb, or Hf.

9. The solid-state hydrogen storage device of claim 8, wherein the second hydrogen storage material is an Fe—Ti alloy or a La—Ni alloy.

10. The solid-state hydrogen storage device of claim 1, wherein the heat medium is water, air, oil, or a combination thereof.

11. The solid-state hydrogen storage device of claim 1, wherein the solid-state hydrogen storage device is for a vehicle.

12. A solid-state hydrogen storage system, comprising:
a storage unit configured to store a first hydrogen storage material therein;
a heat medium pipe disposed in the storage unit including a heat medium;
a separating pipe disposed in the heat medium pipe including a second hydrogen storage material, wherein the second hydrogen storage material is enclosed in the heat medium; and
a first gas supply pipe connected with a storage vessel and the separating pipe,
wherein the first gas supply pipe supplies gaseous hydrogen included in a storage vessel to the separating pipe,
the gaseous hydrogen included in a storage vessel is supplied to a fuel cell, and
the second hydrogen storage material releases heat during hydrogen absorption,
wherein heat is released from the second hydrogen storage material during hydrogen absorption, and
wherein the heat released during the hydrogen absorption is supplied to the first hydrogen storage material included in the storage unit through the heat medium included in the heat medium pipe, thereby releasing hydrogen from the first hydrogen storage material.

13. The solid-state hydrogen storage system of claim 12, wherein the separating pipe comprises steel, aluminum (Al), or copper (Cu).

14. The solid-state hydrogen storage system of claim 12, wherein the first hydrogen storage material is $NaAlH_4$, or a composite including $Mg(NH_2)_2$ and LiH.

15. The solid-state hydrogen storage system of claim 12, wherein the second hydrogen storage material is an Fe—Ti alloy or a La—Ni alloy.

16. The solid-state hydrogen storage system of claim 12, wherein the solid-state hydrogen storage system is for a vehicle.

17. A vehicle comprising a solid-state hydrogen storage device of claim 1.

* * * * *